United States Patent [19]
Farabaugh

[11] 3,733,704
[45] May 22, 1973

[54] METHOD AND APPARATUS FOR DETERMINING CONTOURS OF OBJECTS, ESPECIALLY OF GLASS

[75] Inventor: Aloysius W. Farabaugh, Verona, Pa.

[73] Assignee: PPG Industries, Inc., Pittsburgh, Pa.

[22] Filed: July 23, 1970

[21] Appl. No.: 57,576

Related U.S. Application Data

[63] Continuation-in-part of Ser. No. 858,713, Sept. 16, 1969, abandoned.

[52] U.S. Cl. ................................33/174 L, 33/1 BB
[51] Int. Cl. ...............................................G01b 3/38
[58] Field of Search ......................33/174 PA, 174 P, 33/174 L, 175, 1 R, 1 BB; 324/71 R, 71 NE

[56] References Cited

UNITED STATES PATENTS

| | | | |
|---|---|---|---|
| 3,557,462 | 1/1971 | Kiewicz et al. | 33/174 L |
| 2,394,489 | 2/1946 | Rowe | 33/175 X |
| 3,231,979 | 2/1966 | Perthen et al. | 33/174 L |
| 2,977,533 | 3/1961 | Savage | 33/174 PA X |
| 3,110,112 | 11/1963 | Dalgleish | 33/174 L |
| 3,479,745 | 11/1969 | Lorbeer | 33/174 PA |
| 3,488,852 | 1/1970 | Welker et al. | 33/1 R |

*Primary Examiner*—William D. Martin, Jr.
*Attorney*—Chisholm and Spencer

[57] ABSTRACT

Contours of objects are determined by using equipment comprising a frame, generally conforming to a predetermined contour, a plurality of infinite-resolution linear potentiometers (preferably cermet) connected to the frame, a histogram-type visual-display device, a plurality of trimming potentiometers operatively associated such that there is one for each of said linear potentiometers and the outputs of the trimming potentiometers are connected to the visual-display device, and preferably also a checking tool. Desirably but not necessarily, there are also provided a strip-chart recorder, and a multiplex-scan and filter circuit leading from the inputs to the visual-display device and to the strip-chart recorder, whereby there may be produced a series of traces indicative of the contour of the piece tested. The equipment disclosed will check contours of pieces shaped from flat glass, such as backlights, to an accuracy of about 0.001 inch at high production rates (above five pieces per minute), yet the equipment is simple, does not require calibration against a perfect master, is readily set up, and is readily adapted for use with a different frame to permit inspection of lights of glass of different size and/or shape.

17 Claims, 4 Drawing Figures

INVENTOR
ALOYSIUS W. FARABAUGH

ATTORNEYS

INVENTOR
ALOYSIUS W. FARABAUGH

ATTORNEYS

METHOD AND APPARATUS FOR DETERMINING CONTOURS OF OBJECTS, ESPECIALLY OF GLASS

CROSS-REFERENCES TO RELATED CASES

This application is a continuation-in-part of my earlier filed copending application Ser. No. 858,713, filed Sept. 16, 1969, now abandoned.

BACKGROUND OF THE INVENTION

1. Field of the Invention

This invention relates to inspection apparatus and methods, and in particular, to a method and apparatus for determining the contours of objects, especially of pieces shaped from flat glass.

2. Description of the Prior Art

Multiple-probe contour inspection systems may be considered as known, for example, from Tandler et al. U.S. Pat. No. 2,697,879 and Tandler U. S. Pat. No. 2,880,516. Infinite-resolution positive-sensing devices, such as linear variable differential transformers and cermet-type (non-wound) linear potentiometers may be considered as belonging to the prior art, as may also the wound or coil type of linear potentiometer, which has at the best a resolution of about 0.002 inch. The concept of providing a second potentiometer in series with, or in other suitable operative association with, a first potentiometer to adjust its output signal to an appropriate or desired level may be considered known. Histogram-type visual display devices, of such nature as to be capable of receiving a plurality of 0 to 10 millivolt signals and displaying on a video screen a corresponding plurality of lines or bars that correspond in their length to the values of the individual signals, may also be considered known per se. Multiplexing means, of such nature as to be capable of receiving constantly a plurality of signals and emitting, in rapid succession on an output line a single signal that results from a scanning of the individual ones of the individual signals in a predetermined order and over a desired and preferably adjustable period of scan, such as 3 to 8 seconds, may be considered known per se. Strip-chart recorders are well known, and it may be considered within the ordinary skill of the art of electrical engineering to provide or use, for the display of the value of a signal, such a recorder, with automatic means to advance the strip-chart following each period of operation of the stylus of the recorder.

In the contour inspection of pieces shaped from flat glass, it is a known practice to provide a frame that extends in a generally horizontal direction, has an outline corresponding in shape to the periphery of the kind of piece to be examined, has a plurality of bearing points, and is adapted to receive on those bearing points (of which there are at least three and rather usually five) a horizontally extending piece in predetermined spaced relationship with respect to the frame. It is known, moreover, to inspect the piece by then probing the space between it and the frame at various points around its periphery by means of a tool of suitable dimensions; for this purpose, there may be used a metal bar having in one dimension the minimum allowable spacing between glass and frame and in another dimension the corresponding maximum allowable spacing. Use of such a tool makes it possible to decide whether or not to reject the piece.

Another known practice involves the use of a wedge-shape tool that has indicia scribed therein that indicate its thickness at various points along its length.

Inspection by means of such tools is necessarily rather a slow operation, it not being possible to inspect more than about one windshield per minute by such means. A modern glass-bending line may produce five pieces per minute; this implies that perhaps only some fraction of its output is inspected, or that perhaps the inspection of some pieces is limited to a rapid visual check and possibly the measurement of places suspected of being beyond tolerance limits, or that perhaps five inspection stations are provided, each with its frame and inspector. With practices known prior to the instant invention, the recording of data concerning the pieces inspected was done manually (using pencil, paper and clipboard), to the detriment of the rapidity of the inspection operation if done by an inspector, or to the detriment of the economy of the inspection operation if done by a second man at the inspection station.

SUMMARY OF THE INVENTION

An existing frame is modified by having drilled therethrough 25 vertically extending holes at spaced locations about its periphery. Near each hole there is affixed to the exterior of the frame a bracket that is integral with or connected to a sleeve aligned with a hole and containing a setscrew. Infinite-resolution linear potentiometers are inserted, probe up and lead down, in the sleeves. Each of the linear potentiometers has associated with it a trim potentiometer, whereby its apparent output can be conveniently adjusted to a suitable value, and signals indicative of such apparent output are conveyed to appropriate terminals of a histogram-type visual-display device. The apparent-output signals are also preferably brought to a multiplexing device having associated with its output an electronic filter and a strip-chart recorder that is capable of drawing with its stylus in some time such as 3 to 8 seconds a trace indicative of the separation between the frame and the article being tested at, for example, various positions along the periphery of the article. Also affixed to the exterior of the frame is a limit switch that senses the placing of a piece of glass onto the frame. This activates the multiplex circuit and recorder after a suitable time delay, such as 1 or 2 seconds. There is also provided in accordance with the invention a tool having a face adapted to register with the frame and at least one surface adapted to depress a probe tip of a linear potentiometer until it is at a predetermined spacing from the frame, e.g., corresponding to optimum contour or high limit or low limit. This makes set-up of the equipment very convenient, and independent of the production of a perfect master piece of glass (the frame can be made by modeling the desired contour in wood or other material and then casting). In setting up, the linear potentiometers can be inserted incautiously in their corresponding sleeves and tightened into place with the setscrews. Then by going about the periphery of the frame from one to another of the probe tips with the tool while the histogram-type display device is operating, and by adjusting the bar lengths one after another to bring them to their respective desired or predetermined positions by operating the trim potentiometers, the system is conveniently made ready for use. Changes from one shape of test piece to another can be quickly and conveniently made by merely detaching the linear potentiometers from a frame of one shape and inserting them into another, then preparing the new frame for use in the manner indicated above. Suitable indicia on the display device (provided in any suitable manner) will furnish an immediate indication of the contour of the piece tested with such accuracy that the detection of even small discrepancies, such as 0.0015 inch, may be reliably and conveniently detected, at a testing rate of about 4 to 6 pieces per minute. When a strip-chart recorder is used, a slow scan (about 7 – 8 seconds) will make it possible to record the locations of individual probe tips. A faster scan (about 3 seconds) yields a trace line that is smoother and not so reliably indicative of individual values, but nevertheless such a trace is of value to a person responsible for the controlling of the preceding glass-bending operation. Considered only from the standpoint of making accept-reject decisions, the above-described method and apparatus make it possible for one man to do the work of four or five or more, yet the cost of the equipment is on the order of two or three man-years of wages; the strip-chart records of observed deviations or trends in changes of contour are an added benefit. Those skilled in the art of inspection will perceive how the invention may be applied not only to the gaging of pieces of glass such as sidelights and backlights but also to the gaging of other pieces of different material and different shape.

DESCRIPTION OF DRAWINGS

A complete understanding of the instant invention may be obtained from the foregoing and following description thereof, taken in conjunction with the appended drawings, in which.

DESCRIPTION OF THE PREFERRED EMBODIMENT

OVERALL SYSTEM

Figure 1:
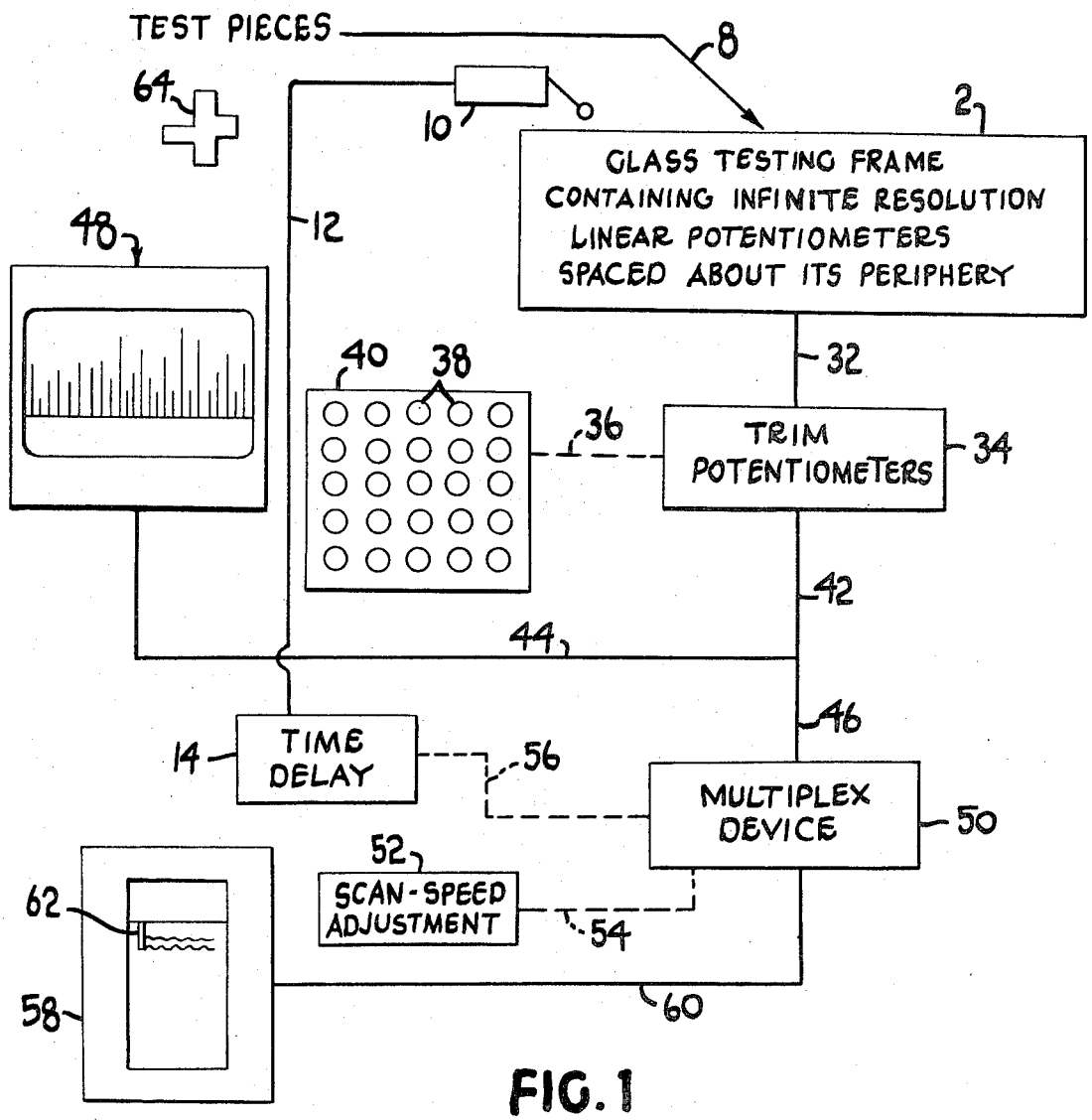
FIG. 1 comprises a schematic indication of the entire system of the invention.

Referring now to FIG. 1, there is indicated at 2 a glass-testing frame containing a number of infinite-resolution linear potentiometers spaced about its periphery. Further understanding of the frame 4 and the manner in which linear potentiometers 6 are spaced about its periphery may be obtained by referring to FIGS. 2 and 3 herein.

Returning to FIG. 1, as indicated at 8, test pieces may be placed upon the frame 4, causing thereby the tripping of a limit switch 10, which is connected by line 12 to a time delay 14, as will be hereinafter more fully explained.

Figure 2:
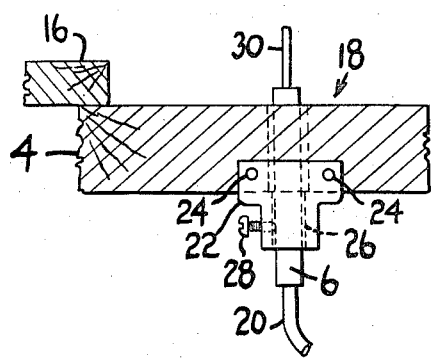
FIG. 2 comprises an elevation view of a portion of a frame used in accordance with the instant invention.
Figure 3:
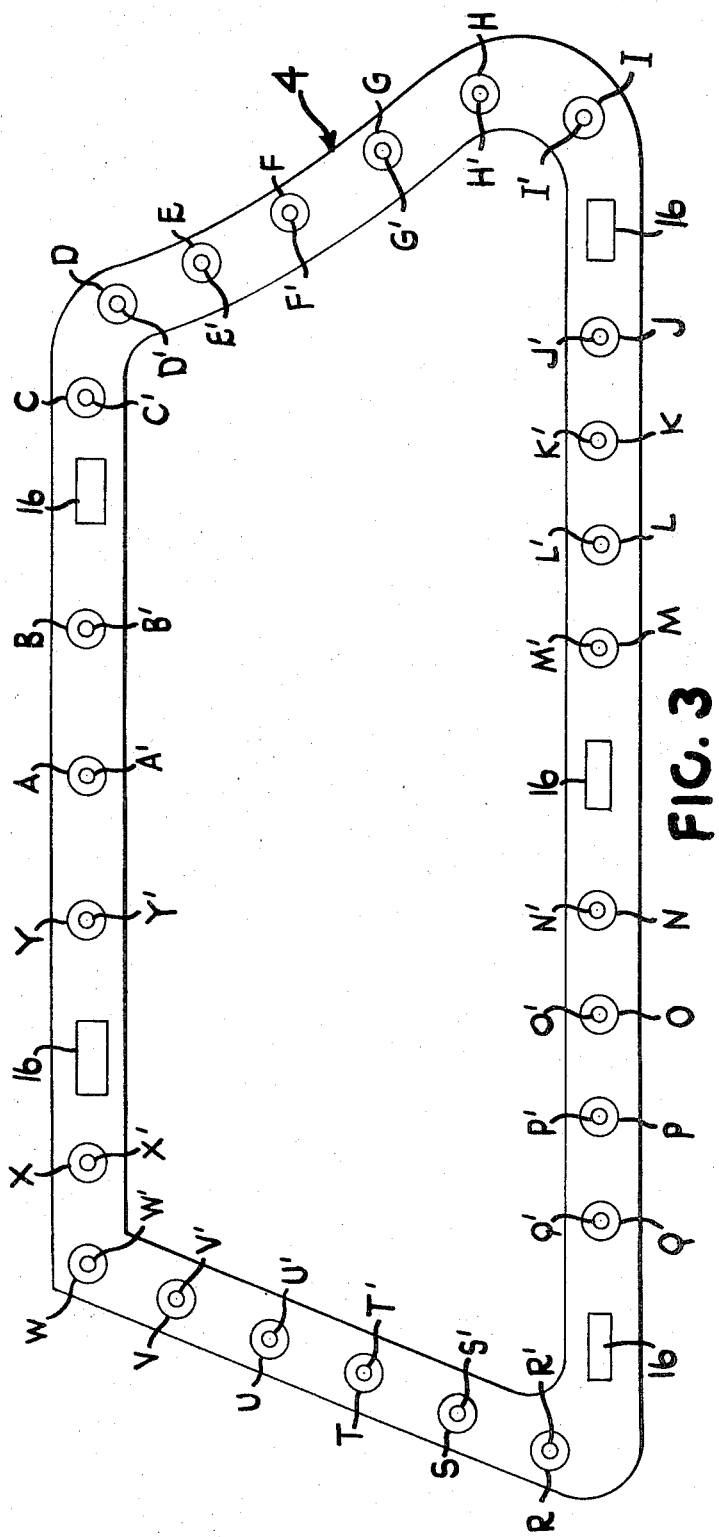
FIG. 3 comprises a plan view of a frame, used in accordance with the instant invention, and FIG. 4 comprises a plan view of a checking tool used in the practice of a method of the instant invention.

Referring for the moment to FIGS. 2 and 3, it will be seen that the frame 4 comprises a plurality of pads or spacers 16 that project upwardly therefrom and serve, as will be understood by those skilled in the art, to space a piece of glass placed vertically downward thereon from the frame 4. Also depicted in FIG. 3 are a plurality of linear potentiometers A through Y, inclusive, having probes, A' through Y'.

FIG. 2 shows a portion of the frame 4 and how a linear potentiometer 6 having a probe end 18 and lead end 20 may be secured thereto, by means of a bracket 22 that is secured to the frame 4 by means of screws 24 and has therein an opening 26 of generally cylindrical form that registers with an opening in the frame 4 and has cooperating with it a setscrew 28, by means of which a linear potentiometer 6 may be secured against falling from opening 26. The linear potentiometer 6 may be, for example, any one of the linear potentiometers A through Y mentioned hereinabove. The linear potentiometer 6 has a probe 30 that is constructed so as to come into contact with the piece to be tested. The potentiometers 6 are, for example, internally spring-loaded so that the probes 30 are normally in a fully extended position unless displaced downwardly by contact with the piece of glass or the like that is being tested.

It is to be understood that the linear potentiometer 6 is preferably, and in the case of the inspection of backlights and similar pieces shaped from flat glass, is almost necessarily a linear potentiometer of the infinite-resolution type, i.e., a cermet linear potentiometer. Those skilled in the art will appreciate that linear potentiometers of the kind known before the invention of the cermet linear potentiometers were wire-wound, such that their resolution was seldom, if practically ever, as good as plus or minus 2 thousandths of an inch. On the other hand, the cermet-type linear potentiometers that are now available possess essentially infinite resolution.

Another modification or equivalent for use in place of the linear potentiometer mentioned above comprises the use of a linear variable differential transformer, such as the element 98 in FIG. 13 of Breitweiser et al. U. S. Pat. No. 3,442,019. Such elements are not preferred, however, because they cost 3 to 4 times as much as appropriate linear potentiometers 6 and they require the use of alternating current in place of the direct current upon which the linear potentiometers 6 operate, as well as a suitable circuit to demodulate and another means to rectify the output current produced before it can suitably be applied in connection with a control circuit operating upon direct current, as is customarily done. Linear variable differential transformers deserve to be mentioned, however, because they are, apart from linear potentiometers of the cermet type, the only kinds of infinite-resolution linear signal-voltage producing device of which the applicant is aware. At least in the gaging of sheets of glass, the use in place of an infinite-resolution linear potentiometer of a wire-wound potentiometer is not, in general, satisfactory. Although the tolerances in the bending of pieces shaped from flat glass and the like are, in most instances, rather large, such as plus or minus 0.035 inch, it is important to use a linear potentiometer of the infinite-resolution type, rather than one of the wire-wound type, since the latter may upon occasion be inaccurate in its output by 1 to 3 turns, namely, about 0.002 to 0.006 inch, and it is frequently desirable to be able to continue to operate the process when the shaped pieces of glass being produced are closer than that to the tolerance limit.

From the foregoing, it will be seen that the invention comprises in a broad aspect the use of a plurality of infinite-resolution position-sensing means, each of said position-sensing means having a normal extended position and the ability to be moved therefrom by contact with said object to a shape-sensing position, each of said position-sensing means being capable of generating, when in said position-sensing position, a signal indicative of the spacing between said frame and said object in the vicinity of said position-sensing means, with the position-sensing means preferably being a plurality of internally spring-loaded linear potentiometers of the non-wound type.

Referring again to FIG. 1, there is indicated at 32 a line by means of which the signals are carried from the potentiometers 6 into operative association with a plurality of trim potentiometers 34 that are controlled, as indicated at 36, by a plurality of knobs 38 mounted on a panel 40.

The outputs of the potentiometers 34 and 6 appear on lines indicated schematically at 42, 44, and 46, and they are conveyed as indicated on the line 44 to a histogram-type visual-display device 48 and preferably also by the line 46 to a multiplex device, as indicated at 50.

The trim potentiometers 34 are of such nature, as will be understood by those skilled in the art, that when used as the reference potential they may be used to augment or diminish suitably an incoming voltage signal on the line 32. The potentiometers 34 are preferably of such nature as to be capable of adjusting an incoming voltage signal by a substantial amount, such as plus or minus 60 per cent; of course, in some circumstances only a considerably lesser possible variation, such as plus or minus 40 per cent will prove adequate and satisfactory.

The histogram-type visual-display device 48 is of a kind known to those skilled in the art, comprising a device capable of displaying upon a video screen a line or bar for each of several input-signal voltages, the length of the line or bar being proportionate to the instantaneous value of the voltage involved. Suitable equipment is described in the Metrascope Instruction Manual, Model M1S12, Metra Instruments, Inc., Mountain View, Calif. The equipment there described comprises suitable circuitry by which, when a knob is turned, there are produced on a video screen a number of grid points. One set of such points may be arranged to be in correspondence with the optimum contour of the piece being gaged, with other essentially parallel sets corresponding to the upper tolerance and the lower tolerance limit. It is also possible, of course, to dispense with such electrically produced grid points and provide instead, for example, on transparent material mounted flush with the video screen, suitable similar indicia. It should also be observed that the visual-display device 48 preferably contains means whereby the gain with respect to individual ones of the bars or lines concerned may be suitably adjusted so as to be increased or decreased. In the case of testing pieces shaped from flat glass such as bent backlights, it is ordinarily satisfactory if the grid is such that intervals of 0.005 inch or 0.010 inch are indicated.

Attention will now be paid to the nature of the multiplex device 50. This is such that it will receive a plurality of incoming voltage signals and then scan them in a predetermined order, beginning at an appropriate time and utilizing an appropriate length of time for the scan, producing on its output line a signal that corresponds in magnitude to one after another of the various signals comprising its input. As indicated in FIG. 1, the multiplex device 50 is thus controlled by both a scan-speed adjustment 52, as indicated at 54, and by the time delay 14, as indicated in 56. I find that a time delay of about 1 to 3 seconds between the placing of glass on the frame 4 and the beginning of the operation of the multiplex device 50 affords adequate time, in testing pieces shaped from flat glass, for the proper positioning of the glass on the device, before the beginning of the operation of the multiplex device 50 and the recording, by the strip-chart recorder 58 hereinafter discussed, of the output of the device 50. It is to be understood that the foregoing has reference to the testing of pieces that have dimensions about 2½ by 6½ feet, contacting them at 25 separate points spaced about the periphery thereof. The pieces are of glass or plastic about 0.125 inch thick, and may have a certain amount of flexibility, such that it is desirable to have them supported at more than three points, usually five.

It is to be understood that the device 50 is preferably of such nature that it produces a signal that it is not merely a succession of different d-c voltages corresponding to the apparent outputs of the linear potentiometers 6 but rather a signal somewhat more complex, containing preferably in conjunction with each of the direct-current output signals a signal component (superimposed a-c frequency or suitably adjusted magnitude of d-c voltage) that is indicative of the position (e.g., about the periphery of the piece being tested) of the linear potentiometer whose output is being sensed. One can perceive, for example, how to construct a device 50 such that as the device steps from one to another of the input signals, discrete and increasing a-c frequencies are superimposed, so that by means of suitable filtering circuits, there are provided to the recorder 58 in effect two signals, a first one indicative of the desired position of the stylus 62 longitudinally of the strip chart and a second one indicative of the desired position of the stylus 62 transversely of the strip chart. Thus, the scan-speed adjustment 52 reliably causes the stylus 62 to traverse the strip-chart at an appropriate rate of speed corresponding to the selected velocity of operation of the multiplexing device 50. Similar results may be obtained by position-encoding the various d-c input signals by using d-c output signals in ranges of potential that are suitably distinct one from another, whereby through the use of a filter or response circuit of a different kind, substantially the same result is achieved. The design of suitable filter and/or response circuits in accordance with criteria hereinabove indicated is considered to be within the capabilities of one ordinarily skilled in the art of control engineering. The alternative possibility of causing the scan-speed adjustment 52 also to regulate the rate of traverse of the stylus 62 directly is not to be ruled out categorically.

The output of the multiplex device 50 is conveyed to the strip-chart recorder 58, as indicated by the line 60. Those skilled in the art will perceive how to achieve a suitable scan-speed adjustment, bearing in mind that for the application above-mentioned the period utilized for the scanning should be on the order of 2 to 10 seconds. Substantial differences in the nature of the trace line produced on the chart recorder 58 may be observed, in accordance with the scan-sped selected. In general, it is desirable either to use a slow speed, such as 8 seconds, for the application indicated above, or a relatively high speed, such as about 3 seconds. When the slow speed is used, the stylus 62 of the strip-chart recorder has time, in passing from one of the reading-indicating positions to the next, to adjust its position so that it generates a rather step-like trace that gives accurate indications of the exact location of the various probes A' through Y', inclusive. A record of this kind is valuable for purposes of statistical quality control. On the other hand, there is the problem that unless the strip-chart recorder has been appropriately set so that its chart advances by a suitable and rather great interval between one pass of the stylus 62 and the next, an individual trace tends to become obscured with or by its neighbors. It is to be understood that the strip-chart recorder 62 is preferably provided with automatic chart-advance means, adjustable as to amount, of the kind indicated above. In accordance with the alternative indicated above, i.e., the use of a rapid scan time, such as about 3 seconds, the strip-chart recorder produces a trace that is more nearly a flowing line, not necessarily indicative of exact values of glass position of the various points contacted by the probes A' through Y'. The use of the strip-chart recorder 58 in this manner serves chiefly to obtain rapidly an indication of the trends in the changes of the contours of the backlights or the like being tested as the production and inspection operations progress. If it develops, for example, that in the location of the probes J' and K' increasingly positive or negative values are being observed, this may indicate to an operator of the preceding bending operation that corrective measures need to be taken therein. As one example, if the glass in one portion is underbent, it might be desirable to increase somewhat the amount of heat supplied to that portion of the glass before it is bent.

Figure 4:
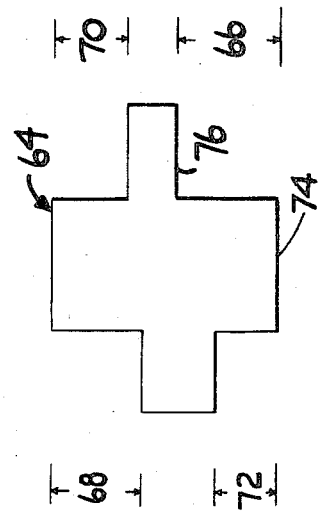

Also indicated in FIG. 1 is a checking tool 64, which is shown in greater detail in FIG. 4. The tool 64 may conveniently be made from a plate or slab of suitable material, such as steel. It is desirable that the tool 64 have dimensions such as to enable it to be held in the hand of the user. Though it will be apparent to those skilled in the art, from the description of the operation of the apparatus of the instant invention obtained hereinabove and hereinbelow, that the invention can be made to work, at least to some extent, without a tool 64 of the kind that is described hereinbelow, it is nevertheless highly advantageous if such a tool can be used.

The tool 64 may be considered as comprising a square cut from a steel slab, from which there have been further cut, at the four corners thereof, further notches that each have distinct dimensions. Referring to FIG. 4, there will be seen that the dimension 66 is the greatest, and the dimensions 68, 70, and 72 are increasingly smaller.

The dimension 66 may conveniently be such as to correspond to the depth required to depress one of the probes 30 or A' a sufficient amount to correspond to the tolerance limit for the maximum separation between the bottom surface of the glass piece being tested and the frame. This means that it would be possible, placing the surface 74 against the frame and the surface 76 against the top of the probe, to go from one probe tip to the next, making sure from the visual-display device that the length of the corresponding bar is such as to indicate the upper tolerance limit. In the event that the display device 48 does not give such an indication, it is necessary to adjust the appropriate one of the trim potentiometers 34 to make the reading correspond to the value desired.

Similarly, the dimension 68 may be such as to indicate the ideal degree of separation between the bottom surface of the glass and the frame, and the dimension 70 may be such as to indicate a minimum-separation tolerance limit. The dimension 72 is conveniently such that if this dimension of the tool 64 is positioned appropriately with respect to the frame and the probe, the display device 48 indicates a zero. It is desirable to have the tool 64 indicate at least two of the four relevant dimensions indicated above, since this will make it possible to check conveniently whether the gain of the histogram-type visual-display device is set properly.

METHOD OF OPERATION

Those skilled in the art will perceive how the equipment that has been described above may be used to test dimensions of pieces of glass or other suitably shaped objects. The linear potentiometers, such as the potentiometer 6 shown in FIG. 2, are inserted in the various sleeves or other openings 26 and secured by means of the setscrews 28, as indicated above. In this operation it is not necessary to position the linear potentiometers 6 accurately, since any inaccuracy in the adjustment of the position of a linear potentiometer may conveniently be taken care of by the use of the trim potentiometers 34. This is done by taking the tool 64 and going from one of the linear potentiometers to the next, with the display device 48 operating, using an appropriately one of the dimensions 66, 68, 70 and 72 and adjusting by appropriate means the appropriate one of the potentiometers 34 to make the line on the display device 48 have the proper length.

In other words, the invention comprises, in a broad method aspect, bringing into contact, one after another, with said position-sensitive means and said frame a tool having dimensions such that at least one of its dimensions corresponds to a value having a relevant relation to a preselected spacing between said frame and one of said plurality of objects to be tested. It should be mentioned that the display device 48 desirably also includes a gain control, preferably but not necessarily one for each of the bars of the histogram-type display, and it is also possible then by making a second round with the tool 64, using for example, the dimension 72, to check whether the gain for each of the bars is appropriately adjusted. This makes it possible to prepare the assembly of the frame 2 and its potentiometers 6 or A through Y for the reception of pieces of glass or other pieces to be tested, all without the necessity of fashioning a perfect master piece or of locating the linear potentiometers A through Y in exact locations, i.e., within the nearest thousandth of an inch.

The frame 2 is thus prepared for the reception of pieces of glass, and pieces of glass are then placed thereon, activating the switch 10. This causes, after a suitable time delay, such as 1 or 2 seconds, the operation of the multiplex device 50 and the drawing on the chart of the recorder 58 by the means of the stylus 62 of a suitable trace that is indicative of the separation between the piece of glass being tested and the frame at the various locations around its periphery. At the same time, there is displayed on the histogram-type display device 48 a series of bars indicative of the separation between the glass piece being tested and the frame at the various locations about the periphery corresponding to the location of the linear potentiometers A through Y.

MODIFICATIONS, EQUIVALENTS AND ADVANTAGES

The frame 2 is not limited to any particular size or shape, so long as it conforms generally to, or departs only in a known fashion from, the ideal shape of the piece to be tested. Very large pieces, such as aircraft wings, may be tested in accordance with the invention.

It should be noted at this point that in use, the edges of the frame 2 may tend to wear in the vicinity of the corners, and it will thus be possible, for example, by retesting a piece of known dimensions (treated when the frame was new and not worn) to learn the extent of the wear and take it into account in the adjustment of the trim potentiometers 34.

In the manufacture of aircraft windshields, it is common to inspect the same piece many times, once after each of several operations performed on the piece in question. The operations so performed are costly, and so are the pieces being worked with, so that it is considered desirable to learn as quickly as possible whether a piece has been spoiled or whether the equipment concerned with one of the operations is malfunctioning. By the use of the instant invention, the time consumed by the necessary repeated inspections is very greatly reduced, and considerable cost savings are realized.

It is conceivable that those skilled in the art will perceive means other than the trim potentiometers 34, which are preferred, for serving substantially the same function in the practice of the invention. In the broadest aspect of the invention, all that is required is that there be provided means responsive to each of the signals from the infinite-resolution position-sensing means for increasing or decreasing their values to produce a corresponding plurality of signals of adjusted value, i.e., preferably ones corresponding to the "apparent outputs" mentioned hereinabove.

It is, of course, not absolutely essential to the invention that the linear potentiometers be connected to the frame in exactly the manner described above. In principle, all that is required is that the linear potentiometers, or whatever is used in their place, be arranged appropriately in spaced positions with respect to the frame, and especially with respect to the upper surface thereof. It is desirable, moreover, for the means that are used to hold the linear potentiometers in spaced relation with respect to the frame be such that it is convenient to connect a linear potentiometer to the frame or disconnect it therefrom.

In place of the non-wound infinite-resolution linear potentiometers mentioned above, it is possible to use an equivalent infinite-resolution position-sensing device such as a differential transformer. The non-wound infinite-resolution linear potentiometer is, however, much to be preferred because of its lower cost and the greater simplicity of the electrical circuitry required when it is used.

As a possible modification, those skilled in the art will readily perceive how, with the use of a null-balance potentiometer or the like, comparing the value of the signal produced by a given linear potentiometer with a predetermined value, the zeroing or adjustment of the display device that is indicated hereinabove as being done by manual adjustment of the trim potentiometers 34 may be accomplished rapidly and automatically. With such a practice, it will be convenient to use a tool that simultaneously depresses all of the probe tips to desired locations, or at the least, pluralities of them.

Although in the preferred aspect of the invention, a histogram-type visual-display device 48 is used, in the broadest aspect of the invention there is no reason why other suitable indicating means, such as an array of galvanometers, could not be used. Thus, in general terms, this element of the invention is a display means responsive to the signals of adjusted value, and preferably a histogram-type visual-display device, i.e., a video tube and means for causing the signals of adjusted value to be displayed thereon in the form of a histogram or bar chart indicating their respective magnitudes.

Again considering the invention in its broadest aspect, the linear potentiometers may be replaced with fluid-operated infinite-resolution position-sensing devices, and if this is done, it is possible to practice a version of the invention based upon the use of fluid-controlled analogs for the various electrical components mentioned hereinabove. For the most part, however, the available fluid-controlled components lack the remarkable accuracy and convenience that can so readily be obtained by the use of the electrical components mentioned hereinabove.

In one distinct aspect, namely that of changing from the inspection of pieces of a first shape to the inspection of pieces of a second shape, the instant invention is particularly advantageous, and in this aspect the invention comprises a method consisting of the steps of detaching from a first frame corresponding to said first shape a plurality of non-wound linear potentiometers having probe tips each of said potentiometers being connected to a trim potentiometer whose output is connected to an output-gage device; attaching said plurality of potentiometers to a second frame corresponding to said second shape; depressing a first one of said probe tips by means of a tool having a dimension corresponding to a preselected spacing between said second frame and the location of said probe tip as so depressed; adjusting the one of the trim potentiometers associated with the linear potentiometer of said first probe tip to bring the output of said trim potentiometer to a preselected value, and then repeating with said tool and the probe tips of the remaining linear potentiometers the steps of depressing and adjusting as aforesaid.

I claim:

1. Apparatus for inspecting the contour of an object, said apparatus comprising, in combination,
    a support,
    a plurality of position-sensing means mounted on said support, each of said position-sensing means being adapted to generate a first signal when in a preselected shape-sensing position relative to a portion of said object and a second signal when in other than said preselected shape-sensing position relative to said portion of said object, said second signal when compared to said first signal being indicative of the deviation of the contour of said portion of said object from a preselected shape of said portion of said object in the vicinity of said position-sensing means,
    a plurality of trim potentiometers for increasing or decreasing the values of said first signals to produce a corresponding plurality of signals of predetermined adjusted value, and display means responsive to respective ones of said first and said second signals for indicating their magnitude.

2. Apparatus as defined in claim 1, characterized in that
said support comprises a frame having in one portion thereof a preselected contour of said object to be inspected.

3. Apparatus as defined in claim 2, characterized in that
said apparatus further comprises means for adjustably positioning said position-sensing means relative to said frame.

4. Apparatus as defined in claim 3, characterized in that
said plurality of position-sensing means comprises a plurality of internally spring-loaded linear potentiometers of the non-wound type.

5. Apparatus as defined in claim 4, characterized in that
said means for adjustably positioning said position-sensing means relative to said frame comprises a plurality of corresponding brackets secured to said frame and containing sleeve members that register with openings in said frame.

6. Apparatus as defined in claim 5, characterized in that
said display means comprises a video tube and means for causing respective ones of said first and said second signals to be displayed thereon in the form of a histogram indicating their respective magnitudes.

7. Apparatus as defined in claim 6, characterized in that
said apparatus further comprises a multiplex device responsive to respective ones of said first and said second signals and a strip-chart recorder for recording their respective magnitudes.

8. Apparatus as defined in claim 7, characterized in that
said apparatus further comprises a tool means for contacting said frame and said position-sensing means and having a dimension corresponding to a preselected spacing between said frame and said object and further dimensions corresponding to the upper and lower tolerance limits of spacing of said object with respect to said frame.

9. Apparatus as defined in claim 1, characterized in that
said display means comprises a video tube and means for causing respective ones of said first and said second signals to be displayed thereon in the form of a histogram indicating their respective magnitudes.

10. Apparatus as defined in claim 9, characterized in that
said apparatus further comprises a multiplex device responsive to respective ones of said first and said second signals and a strip-chart recorder for recording their respective magnitudes.

11. Apparatus as defined in claim 1, characterized in that
said apparatus further comprises a multiplex device responsive to respective ones of said first and said second signals and a strip-chart recorder for recording their respective magnitudes.

12. Apparatus as defined in claim 1, characterized in that
said apparatus further comprises means for setting said preselected shape-sensing position of said position-sensing means and the upper and lower tolerance limits of movement of said position-sensing means.

13. A method of inspecting for their respective contour a plurality of objects, said method comprising the steps of
positioning an object to be inspected in engagement with a plurality of position-sensing means mounted on a support,
prior to positioning said object, adjusting by appropriate means the value of a first signal generated by said position-sensing means when in a preselected shape-sensing position, to produce a corresponding plurality of signals of predetermined adjusted value,
generating by engagement of said object with said position-sensing means said first signal when said position-sensing means is in said preselected shape-sensing position relative to a portion of said object and a second signal when in other than said preselected shape-sensing position relative to said portion of said object, the magnitude of said second signal when compared to the magnitude of said first signal being indicative of the deviation of the contour of said portion of said object from a preselected shape of said portion of said object in the vicinity of said positioned-sensing means,
transmitting respective ones of said first and said second signals to a display means for indicating their magnitudes, and
displaying the respective magnitudes of said signals on said display means.

14. A method as defined in claim 13, characterized in that said method comprises the further step of sensing the magnitudes of each of said respective ones of said first and said second signals, one after another in preselected order, and displaying the values as sensed on a strip-chart recorder.

15. A method as defined in claim 14, characterized in that the scan time for said strip-chart recorder for about 25 points is about 1 to 4 seconds.

16. A method as defined in claim 15, characterized in that the scan time of said strip-chart recorder for about 25 points is about 7 to 9 seconds.

17. A method as defined in claim 13, characterized in that said method comprises the further step of sensing the magnitudes of each of said respective ones of said first and said second signals, and displaying the value as sensed on a video tube.

* * * * *

UNITED STATES PATENT OFFICE
CERTIFICATE OF CORRECTION

Patent No. 3,733,704                Dated May 22, 1973

Inventor(s) Aloysius W. Farabaugh

It is certified that error appears in the above-identified patent and that said Letters Patent are hereby corrected as shown below:

Claim 13, Column 12, line 37, change "positioned" to ---position---.

Signed and sealed this 1st day of January 1974.

(SEAL)
Attest:

EDWARD M. FLETCHER, JR.          RENE D. TEGTMEYER
Attesting Officer                   Acting Commissioner of Patents